US012334047B1

(12) United States Patent
Warnick et al.

(10) Patent No.: US 12,334,047 B1
(45) Date of Patent: Jun. 17, 2025

(54) SYSTEM AND METHOD FOR AUTOMATICALLY EDITING VOICE SIGNALS

(71) Applicant: UIPCO, LLC, San Antonio, TX (US)

(72) Inventors: Mark Paxman Warnick, San Antonio, TX (US); Nathan Lee Post, Rockport, TX (US); Joel S. Hartshorn, Port Orchard, WA (US); Christian A. Williams, San Antonio, TX (US); Will Kerns Maney, Jr., New York City, NY (US); Ravi Durairaj, San Antonio, TX (US); Nolan Serrao, Plano, TX (US); Donald Nathaniel Holloway, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 250 days.

(21) Appl. No.: 17/822,880

(22) Filed: Aug. 29, 2022

Related U.S. Application Data

(60) Provisional application No. 63/238,850, filed on Aug. 31, 2021.

(51) Int. Cl.
    *G10L 13/00*   (2006.01)
    *G10L 13/033*  (2013.01)
    *G10L 25/78*   (2013.01)
    *G10L 15/02*   (2006.01)
    *G10L 15/22*   (2006.01)

(52) U.S. Cl.
    CPC ............ *G10L 13/033* (2013.01); *G10L 25/78* (2013.01); *G10L 15/02* (2013.01); *G10L 15/22* (2013.01)

(58) Field of Classification Search
    CPC ......... G10L 15/07; G10L 15/20; G10L 15/22; G10L 15/26; G10L 15/30; G10L 15/16; G10L 25/27; G10L 25/30; G10L 19/00; G10L 19/005; G10L 21/0208; G10L 15/08; G10L 15/063; G10L 15/02; G10L 25/78; G10L 25/87; G10L 13/02; G10L 13/033; G10L 13/08; G10L 15/06; G10L 17/18; G10L 13/00; G10L 13/04; G10L 13/10
    See application file for complete search history.

(56) References Cited

U.S. PATENT DOCUMENTS

| | | | |
|---|---|---|---|
| 9,240,177 B2* | 1/2016 | Bangalore | G10L 13/02 |
| 10,217,466 B2* | 2/2019 | Davies | G10L 21/0364 |
| 10,475,440 B2* | 11/2019 | Hiroe | G10L 15/04 |
| 11,211,062 B2* | 12/2021 | Lee | G10L 21/0224 |

* cited by examiner

*Primary Examiner* — Vu B Hang
(74) *Attorney, Agent, or Firm* — Plumsea Law Group, LLC

(57) ABSTRACT

Systems and methods that can automatically and intelligently edit audio signals to correct issues with voices and background noise. Such features may be especially useful as more people decide to work remotely. With remote work, some employees may be multi-tasking, for example by dropping off and picking up their kids while in meetings. Background noise reduction is essential for these remote workers. Using the exemplary systems and methods, remote workers could participate in live calls and/or create recordings while going about their daily chores. In particular, these remote workers would not need to wait until they are back home or in a quieter environment for participating in calls and/or making recordings.

20 Claims, 4 Drawing Sheets

SYSTEM AND METHOD FOR AUTOMATICALLY EDITING VOICE SIGNALS

CROSS-REFERENCE TO RELATED APPLICATIONS

This application claims the benefit of Provisional Patent Application No. 62/238,850 filed Aug. 31, 2021, and titled "System and Method for Automatically Editing Voice Signals," which is incorporated by reference herein in its entirety.

BACKGROUND

With the growth of conversational experiences many people are joining clubhouse rooms, vlogging, recording stories, or participating in zoom calls while driving in the car, taking care of children, or in other contexts where background noise is sufficiently loud. The increased sensitivity of microphones in phones and other digital devices makes it even more common for other noises to get picked up during these recordings. Currently, removing background noise and fixing any audio dialogue in video and/or audio recordings requires post recording processing using complicated audio software.

There is a need in the art for a system and method that addresses the shortcomings discussed above.

SUMMARY

In some aspects, the techniques described herein relate to a method of automatically correcting an audio signal, including: receiving the audio signal; detecting a voice signal in the audio signal using a voice detection module; analyzing the audio signal, using a voice extraction module, and determining if the voice signal detected by the voice detection module can be extracted from the audio signal; upon determining that the voice signal can be extracted from the audio signal: extracting the voice signal from the audio signal; and generating a corrected audio signal using the extracted voice signal; and upon determining that the voice signal cannot be extracted from the audio signal: generating a synthesized voice signal; and generating a corrected audio signal using the synthesized voice signal.

In some aspects, the techniques described herein relate to a non-transitory computer-readable medium storing software including instructions that are executable by one or more device processors to automatically correct an audio signal by: receiving the audio signal; detecting a voice signal in the audio signal using a voice detection module; analyzing the audio signal, using a voice extraction module, and determining if the voice signal detected by the voice detection module can be extracted from the audio signal; upon determining that the voice signal can be extracted from the audio signal: extracting the voice signal from the audio signal; and generating a corrected audio signal using the extracted voice signal; and upon determining that the voice signal cannot be extracted from the audio signal: generating a synthesized voice signal; and generating a corrected audio signal using the synthesized voice signal.

In some aspects, the techniques described herein relate to a system for automatically correcting an audio signal, the system including: a device processor; and a non-transitory computer readable medium storing instructions that are executable by the device processor to: receive an audio signal; detect a voice signal in the audio signal using a voice detection module; analyze the audio signal, using a voice extraction module, and determine if the voice signal detected by the voice detection module can be extracted from the audio signal; upon determining that the voice signal can be extracted from the audio signal, the instructions are further executable to: extract the voice signal from the audio signal; and generate a corrected audio signal using the extracted voice signal; and upon determining that the voice signal cannot be extracted from the audio signal, the instructions are further executable to: generate a synthesized voice signal; and generate a corrected audio signal using the synthesized voice signal.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods that can automatically and intelligently edit audio signals to correct issues with voices and background noise. Such features may be especially useful as more people decide to work remotely. With remote work, some employees may be multi-tasking, for example by dropping off and picking up their kids while in meetings. Background noise reduction is essential for these remote workers. Using the exemplary systems and methods, remote workers could participate in live calls and/or create recordings while going about their daily chores. In particular, these remote workers would not need to wait until they are back home or in a quieter environment for participating in calls and/or making recordings.

The systems and methods can automatically detect and track voices within an audio clip, as well as background noise. Based on this analysis, the system can determine if background noise reduction and/or modification of any voice signals is needed. If so, the systems and methods can automatically extract voice signals from the audio signal where possible and remove unwanted background noise. Alternatively, when voice extraction is not possible, the systems and methods can automatically generate synthetic voices to replace the originally recorded voices within the audio file.

The exemplary systems and methods provide a way to continuously track and clean a user's voice so that their voice sounds clear, full, and sufficiently loud, even as they talk through noisy environments. For example, the system could automatically analyze new audio recordings on a user's phone (including the audio track(s) of a video recording) and automatically remove the sounds of wind, car noises, and other unwanted ambient sounds. The system could also generate synthetic voice signals to replace voice signals that are inconsistent or overwhelmed by ambient noise. This allows users to create high quality audio in a variety of different environments that would otherwise be too noisy.

It may be appreciated that the systems and methods can be used with any kind of audio signal, including recorded audio signals and streaming (or broadcast) audio signals.

Figure 1:
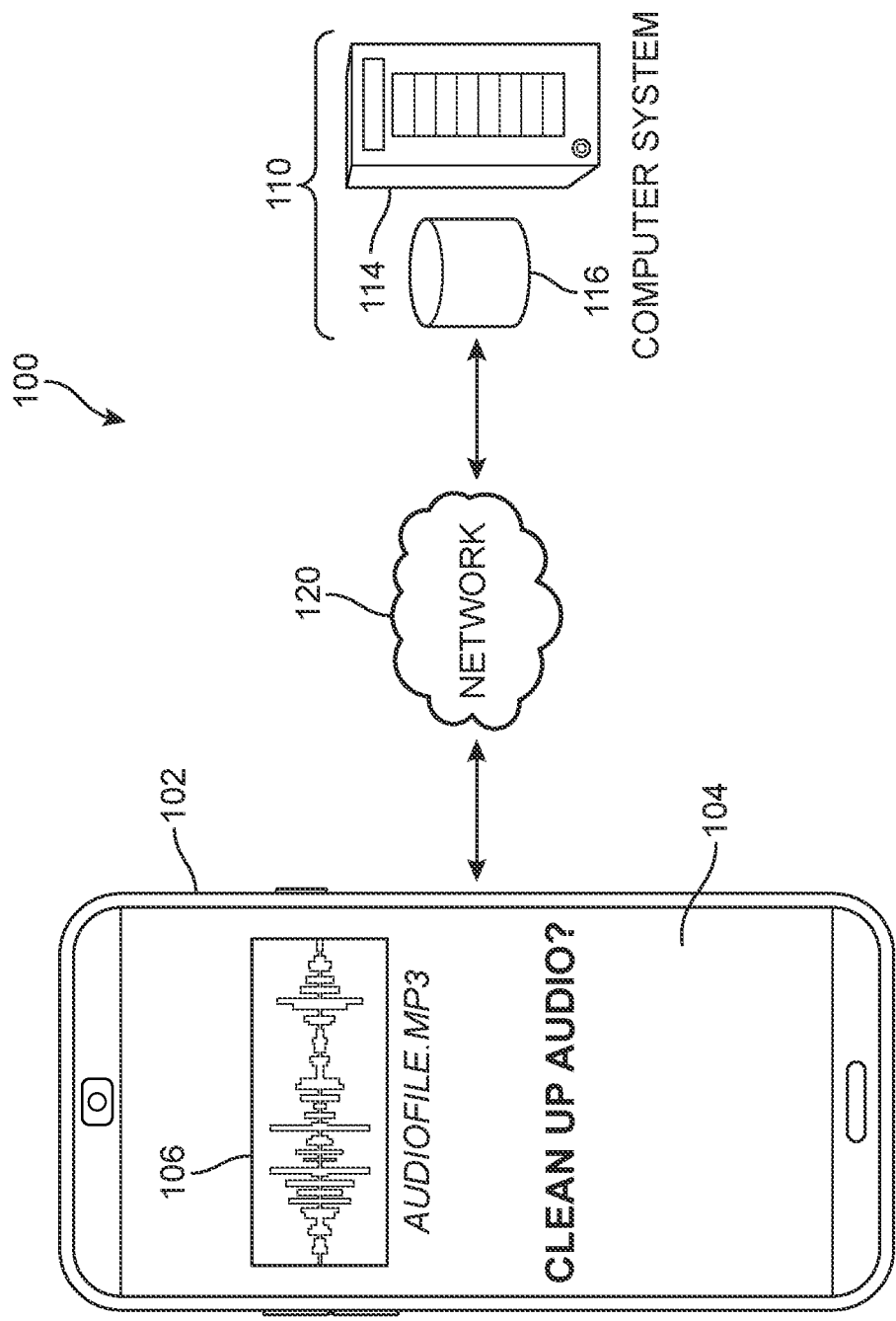
FIG. 1 is a schematic view of an embodiment of an architecture for editing voice signals in recorded audio.

FIG. 1 is a schematic view of an architecture 100 for a system that can intelligently clean audio to remove unwanted background noise and/or modify voice signals to ensure voices are clear, loud, and otherwise consistent throughout the audio signal. In one embodiment, a user may have a mobile device 102 (such as a smartphone) that can run an intelligent audio editing application 104. A mobile device can comprise processors and memory for running one or more mobile applications, such as intelligent audio editing application 104. Additionally, a mobile device may include a camera, microphone, and/or other features that can be used to capture audio recordings.

In this example, application 104 includes an audio clip 106 and provides a prompt to the user for cleaning audio clip 106.

In some cases, application 104 comprises the front-end of a software system, with a backend residing on a remote computer system 110. Computer system 110 could comprise one or more servers or other computing devices. Computer system 110 can include a computing device 114, which may further include processors and memory storing instructions that can be executed by the processors. Specifically, the memory could be a non-transitory computer-readable medium storing instructions that can be executed by one or more processors. Computer system 110 may also include data storage 116, which may provide long term data storage. In some cases, data storage 116 comprises a database that is implemented on suitable hardware.

Components of the software system running on computer system 110 may communicate with application 104 (and device 102) over network 120.

In other embodiments, application 104 may be a standalone software application that does not communicate with remote systems. Instead, application 104 could include all the necessary software components that might otherwise be stored and run on a remote computer system.

Figure 2:
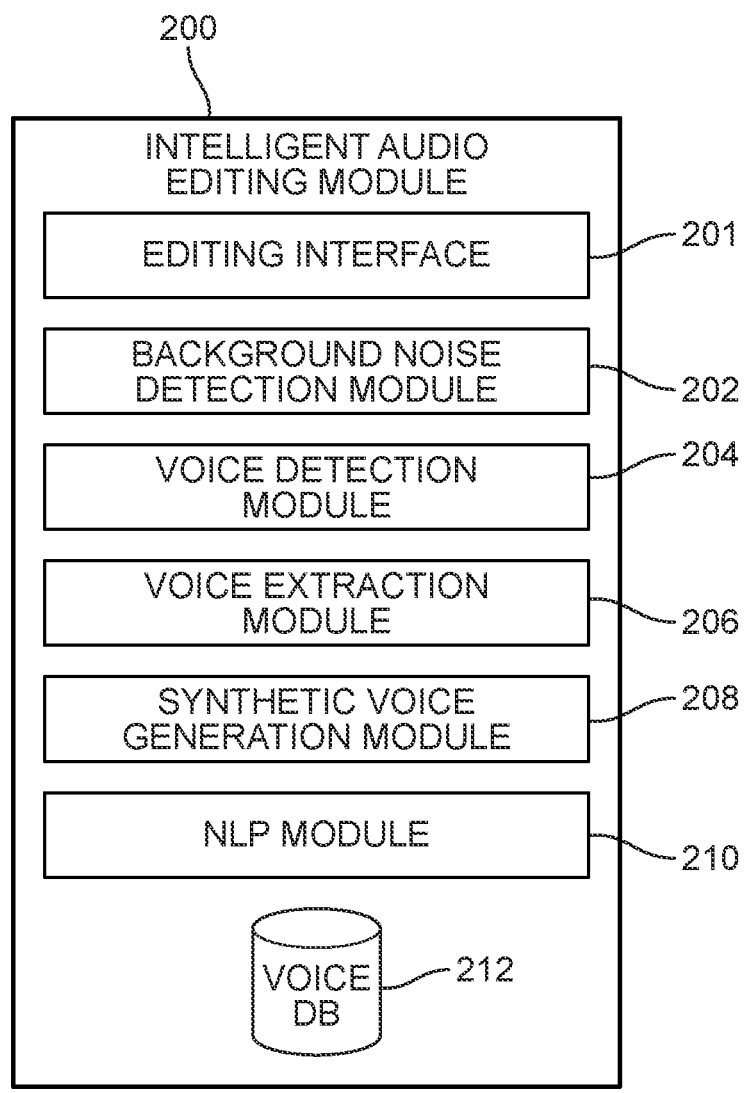
FIG. 2 is a schematic view of an intelligent audio editing module, according to an embodiment.

Referring now to FIG. 2, embodiments may include an intelligent audio editing module 200 ("editing module 200"). Editing module 200 may include an editing interface 201. In some cases, editing interface 201 comprises a user interface that includes controls for selecting, uploading, editing, and otherwise manipulating audio signals, which may be stored in a variety of different audio formats on mobile device 102 and/or in a cloud storage system. In other cases, editing interface 201 may not be user facing, and may comprise one or more application programming interfaces that allow the intelligent editing software to automatically detect, analyze, and modify audio files stored on a user's mobile device or audio files that are otherwise accessible to the software (for example, through a shared online storage system).

Editing module 200 may also include a background noise detection module 202 ("detection module 202"). Detection module 202 can analyze audio signals to detect instances where the background noise drowns out, or otherwise interferes with, voice signals in the analyzed audio signal. In some cases, detection module 202 may automatically scan any selected audio signals using background noise detection module 202, to determine if further analysis is necessary.

Editing module 200 may also include a voice detection module 204. Voice detection module 204 can analyze an audio signal to determine if there is a voice signal in the audio signal. Additionally, editing module 200 may include a voice extraction module 206. Voice extraction module 206 can extract (that is, isolate) the portion of an audio signal that corresponds to a particular voice. Thus, if an audio clip of a person speaking over a quiet hum is analyzed, the voice extraction module 206 could extract only the sound of the person speaking (the voice signal) and remove the quiet hum (background noise).

Both voice detection module 204 and voice extraction module 206 can make use of techniques from the fields of source separation and digital signal processing, in which processes have been developed to separate a mixed signal into a set of source (unmixed) signals. Exemplary methods that can be used include algorithms based on principle component analysis, independent component analysis, neural networks, and deep neural networks. In some embodiments, algorithms can be used that apply a process called time-frequency masking to separate speech signals from background signals. In some cases, the algorithms could use a deep neural network to learn the best time-frequency masks to apply to a given set of signals.

Embodiments can also include a synthetic voice generation module 208. Synthetic voice generation module 208 can automatically generate a voice signal that attempts to model an existing voice signal. That is, synthetic voice generation module 208 can generate voice signals that are sufficiently similar to voice signals made by a particular user, such that it is very difficult to determine the difference between the authentic (recorded) voice signal and the synthetic voice signal. In some embodiments, text-to-speech (TTS) systems based on deep learning could be used.

Editing module 200 may include a natural language processing (NLP) module 210, which may comprise various machine learning algorithms, packages, tools, models, data, and other information useful in detecting, understanding, and synthesizing voice signals and speech.

To facilitate voice detection and/or voice synthesis, editing module 200 may include a voice signal database 212 ("voice database 212"). Voice database 212 may be used to store voice signals for known users, which may help in identifying known voice signals and in synthesizing voice signals that are intended to mimic a user's voice. Additionally, in some cases, voice database 212, or a separate database, could be used to store ambient noises that the system may be required to synthesize and/or that the system can combined directly with other signals.

Figure 3:
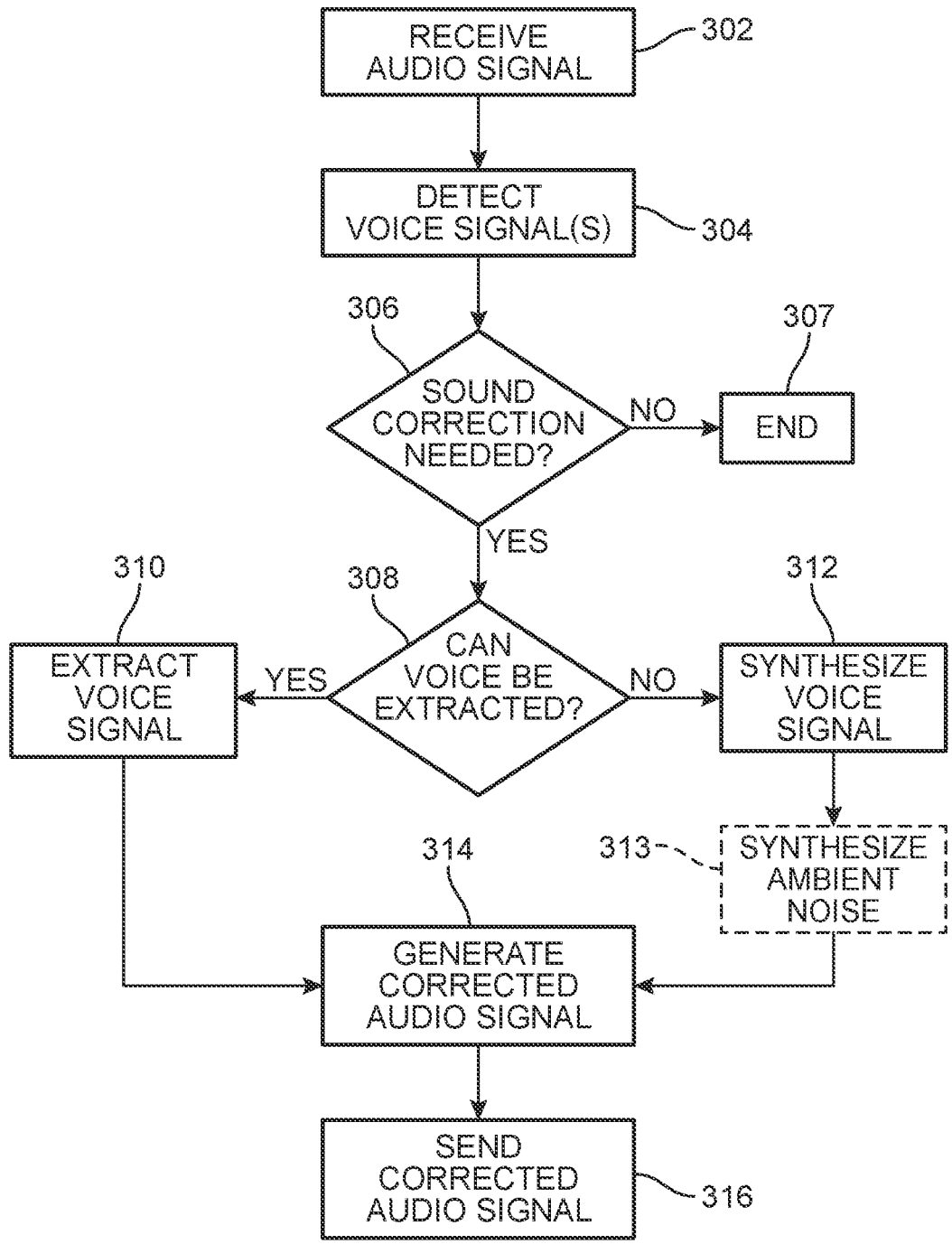
FIG. 3 is a schematic view of a process for generating corrected audio signals, according to an embodiment.

FIG. 3 is a schematic view of a process for automatically correcting an audio signal to ensure a user's voice is clear and stands out against any background noise in the recording. In some embodiments, the steps of the exemplary process could be performed by an intelligent audio editing module (such as editing module 200).

Starting in step 302, an editing module may receive an audio signal. As an example, in one embodiment, a user could record an audio clip for a podcast episode that they are planning to publish. The audio clip may include the user's voice, as well as other ambient noises that obscure the voice or result in a lower quality audio track than the user would like. Therefore, the user could upload the audio signal to an intelligent audio editing application to fix the audio issues.

In step 304, the editing module could detect one or more voice signals, using voice detection module 204. In step 306, the editing module could check to see if any sound correction is needed. In other words, upon detecting the voice signal in step 304, the system could then check if the voice signal is obscured by other noise in the signal. In some cases, background noise detection module 202 could be used to identify any background noise signals, and those could be compared with any detected voice signals to determine if there may be sufficient interference that would lessen the quality of the vocal signal. If the editing module determines that no sound correction is needed, the system may end at step 307.

If the editing module determines that sound correction is necessary, the editing module proceeds to step 308. In step 308, the editing module checks to see if the voice can be extracted, using voice extraction module 206. If so, the editing module can extract the voice signal in step 310. In step 310, using voice extraction module 206, the detected voice signal is extracted from any background signals or other competing signals. Once the voice signal has been isolated, the editing module can generate a corrected audio signal in step 314. In some cases, the system may use only the extracted voice signal in the corrected audio signal, thereby eliminating or "filtering out" the background noise. In other cases, the system could modify the voice signal, for example, by increasing the amplitude (volume) and then recombine it with the other signals so that the ambient noise of the recording is not lost.

If, in step 308, the editing module determines that the voice signal cannot be extracted from the audio signal, the editing module may proceed to step 312. In step 312, the editing module may synthesize a new voice signal intended to match the recorded voice signal, using, for example, synthetic voice generation module 208. In some cases, the editing module may identify the speaker associated with the voice signal, confirm the voice belongs to the user of the application, and automatically retrieve a stored sample of the user's voice (a "voice signal sample") from a database (such as voice database 212) in order to generate a synthetic voice signal that sounds exactly like the user.

In some cases, the system must extract the text of the recorded voice signal and use that as input to the synthetic voice generation module. This ensures that the synthesized voice signal matches the recorded voice signal.

Once the synthetic voice signal has been generated in step 312, the editing module can generate a corrected audio signal in step 314. In some cases, the system may use only the synthetic voice signal in the corrected audio signal. In other cases, the system could modify the voice signal, for example by increasing the amplitude (volume) and then recombine it with the recorded audio signal so that the ambient noise of the recording is not lost.

As an optional step 313, the editing module could synthesize any ambient noise from the original audio recording. This synthesized ambient noise could then be combined with the synthesized voice signal in step 314 to generate a corrected audio signal. Layering in synthetic noises with any synthetic voice signals could help maintain continuity across the different audio signals that may be mixed together at a later time. Additionally, using synthetic noises could help maintain continuity with other portions of the same audio signal that is being edited. Such a feature may reduce the tendency for noticeable "gaps" to appear in the audio where the background noise suddenly drops out in places where the synthesized voice has replaced the recorded voice.

After generating a corrected audio signal in step 314, the editing module can proceed to step 316. In step 316, the corrected audio signal can be sent to any desired endpoint module, application, or other system.

Figure 4:
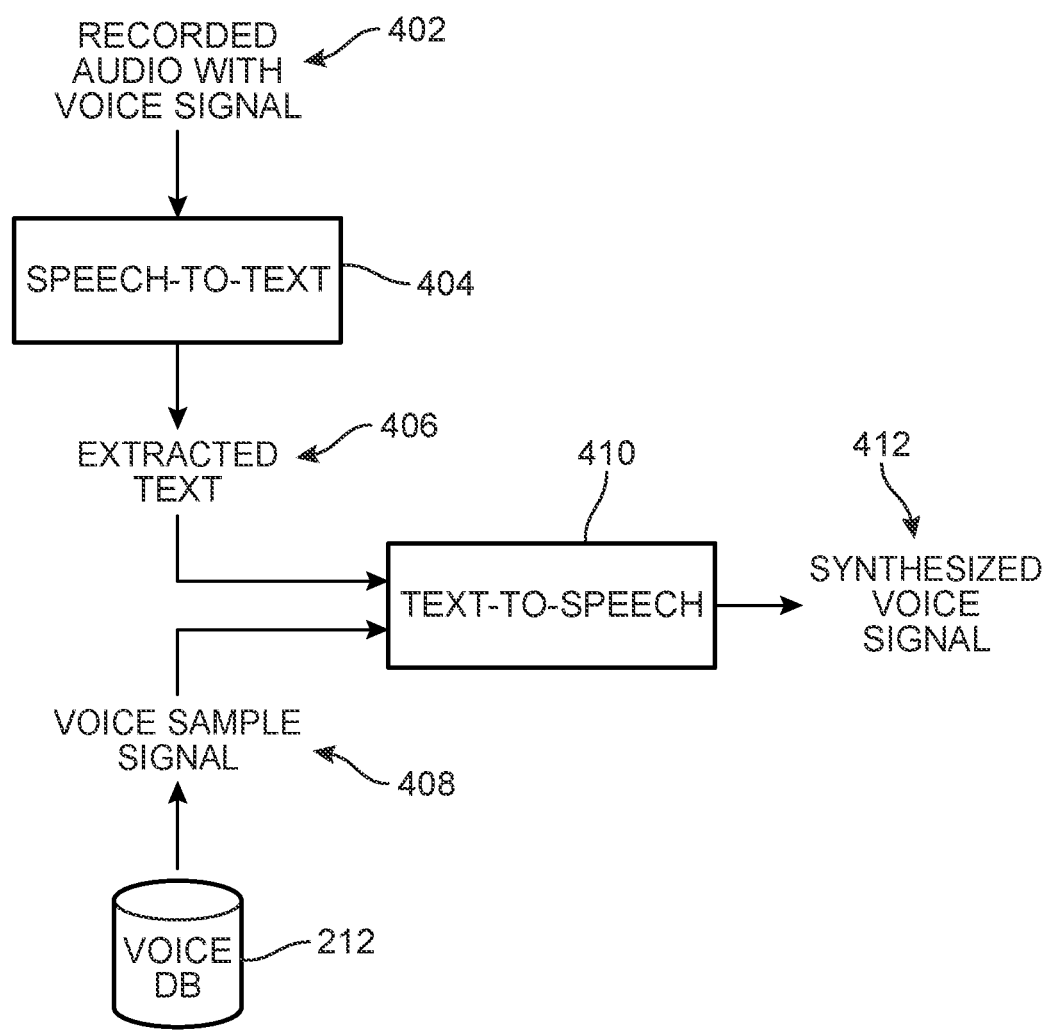
FIG. 4 is a schematic view of an architecture for generating synthesized voice signals, according to an embodiment.

FIG. 4 is a schematic view of one possible architecture for generating a synthesized voice signal that can be used to replace the voice signal in recorded audio. Referring to FIG. 4, recorded audio with a voice signal (recorded signal 402) can be analyzed by a speech-to-text system 404 to generate extracted text (text 406). The system can also retrieve a voice sample signal (sample signal 408), for example, from voice database 212. Extracted text 406 and sample signal 408 can be provided as inputs to a text-to-speech system 410, which outputs a synthesized voice signal 412.

In some cases, text-to-speech system 410 may be a deep learning based text-to-speech system (TTS). In one configuration, the deep learning TTS system uses a speaker encoder to encode input voice samples (such as sample signal 408), and a text encoder to encode input text (such as extracted text 406). The output of the speaker encoder and the text encoder are combined and then decoded into a spectrogram using a decoder. A vocoder then converts the spectrogram into the desired synthesized voice signal. Within this architecture, the encoders, decoders and vocoders can be trained using deep neural networks.

In the exemplary embodiment of FIG. 4, a voice sample may be provided to a text-to-speech system at the time of speech synthesis. However, in other embodiments, the system could be previously trained using the voice of a single user. In such cases, the system may only require the text to be spoken at the time of speech synthesis.

A variety of use cases are considered for purposes of clarifying the operation of the exemplary system and methods.

In a first example, a user may be recording a description of an item they are reviewing for an online review site. The recording may take place outside with ambient noises. Using the exemplary system, the user could upload the recording of the description to an application running on their mobile phone and indicate that they would like to have the audio cleaned up. Once started, the system could automatically analyze the recorded audio file and identify the user's voice signals. The system could check to see if it's possible to simply extract the user's voice signal from the background noise. If the background noise and the speaker's voice are sufficiently mixed together and cannot be easily separated, the system can proceed to automatically synthesize new voice signals to mimic the user's recorded voice. The system could then generate a corrected audio signal, which includes the synthesized signal, and then pass the corrected signal to an appropriate end point. In this case, the original audio signal could be completely replaced with the synthesized voice signal, or with a combination of the synthesized voice signal plus a synthesized ambient background to give the audio a more natural quality.

In another example, a user may be recording an audio clip in which the user speaks over ambient noise that the user wants to capture along with his or her voice. In this case, the recorded voice signal can be extracted and/or a new voice signal could be synthesized. The extracted to synthetic voice signal could be amplified, smoothed, or otherwise modified to make the user's voice sound sufficiently loud, clear, and consistent. Rather than deleting the original audio recording, the system could mix the modified voice signal (extracted or synthesized) with the original audio recording so that the audio file still contains the original ambient noise desired by the user.

It may be appreciated that the exemplary systems and methods may be used to edit portions of an audio file, rather than the entirety of the audio file. For example, if only a small portion of a recorded audio signal is low quality, the system could be applied to the that particular section of audio to make the voice in that section louder and/or clearer.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of automatically correcting an audio signal, comprising:
   receiving the audio signal;
   detecting a voice signal in the audio signal using a voice detection module;
   analyzing the audio signal, using a voice extraction module, and determining if the voice signal detected by the voice detection module can be extracted from the audio signal;
   upon determining that the voice signal can be extracted from the audio signal:
      extracting the voice signal from the audio signal; and
      generating a corrected audio signal using the extracted voice signal; and
   upon determining that the voice signal cannot be extracted from the audio signal:
      generating a synthesized voice signal;
      synthesizing an ambient noise present in the received audio signal; and
      combining the synthesized voice signal with the synthesized ambient noise to generate a corrected audio signal in which both the synthesized voice signal and the synthesized ambient noise remain audible.

2. The method according to claim 1, wherein extracting the voice signal includes using time-frequency masking techniques.

3. The method according to claim 1, wherein generating the synthesized voice signal includes retrieving a voice signal sample.

4. The method according to claim 3, wherein generating the synthesized voice signal further includes:
   extracting text from the detected voice signal; and
   providing the extracted text and the retrieved voice signal sample to a text-to-speech system.

5. The method according to claim 1, wherein the method further includes recording the audio signal with a microphone on a mobile device.

6. The method according to claim 1, wherein the audio signal is received from a mobile device, and wherein the method further includes sending the corrected audio signal to the mobile device.

7. A non-transitory computer-readable medium storing software comprising instructions that are executable by one or more device processors to automatically correct an audio signal by:
   receiving the audio signal;
   detecting a voice signal in the audio signal using a voice detection module;
   analyzing the audio signal, using a voice extraction module, and determining if the voice signal detected by the voice detection module can be extracted from the audio signal;
   upon determining that the voice signal can be extracted from the audio signal:
      extracting the voice signal from the audio signal; and
      generating a corrected audio signal using the extracted voice signal; and
   upon determining that the voice signal cannot be extracted from the audio signal:
      generating a synthesized voice signal;

synthesizing an ambient noise present in the received audio signal; and combining the synthesized voice signal with the synthesized ambient noise to generate a corrected audio signal in which both the synthesized voice signal and the synthesized ambient noise remain audible.

8. The non-transitory computer-readable medium storing instructions according to claim 7, wherein extracting the voice signal includes using time-frequency masking techniques.

9. The non-transitory computer-readable medium storing instructions according to claim 7, wherein generating the synthesized voice signal includes retrieving a voice signal sample.

10. The non-transitory computer-readable medium storing instructions according to claim 9, wherein generating the synthesized voice signal further includes:

extracting text from the detected voice signal; and providing the extracted text and the retrieved voice signal sample to a text-to-speech system.

11. The non-transitory computer-readable medium storing instructions according to claim 7, wherein the instructions are further executable to record the audio signal with a microphone on a mobile device.

12. The non-transitory computer-readable medium storing instructions according to claim 7, wherein the audio signal is received from a mobile device, and wherein the instructions are further executable to send the corrected audio signal to the mobile device.

13. A system for automatically correcting an audio signal, the system comprising:

a device processor; and a non-transitory computer readable medium storing instructions that are executable by the device processor to:

receive an audio signal;

detect a voice signal in the audio signal using a voice detection module;

analyze the audio signal, using a voice extraction module, and determine if the voice signal detected by the voice detection module can be extracted from the audio signal;

upon determining that the voice signal can be extracted from the audio signal, the instructions are further executable to:

extract the voice signal from the audio signal; and generate a corrected audio signal using the extracted voice signal; and upon determining that the voice signal cannot be extracted from the audio signal, the instructions are further executable to:

generate a synthesized voice signal;

synthesize an ambient noise present in the received audio signal; and combine the synthesized voice signal with the synthesized ambient noise to generate a corrected audio signal in which both the synthesized voice signal and the synthesized ambient noise remain audible.

14. The system according to claim 13, wherein the instructions are further executable to extract the voice signal using time-frequency masking techniques.

15. The system according to claim 13, wherein the instructions are further executable to generate the synthesized voice signal by retrieving a voice signal sample.

16. The system according to claim 15, wherein the instructions are further executable to generate the synthesized voice signal by:

extracting text from the detected voice signal; and providing the extracted text and the retrieved voice signal sample to a text-to-speech system.

17. The system according to claim 13, wherein the instructions are further executable to record the audio signal with a microphone on a mobile device.

18. The system according to claim 13, wherein the audio signal is received from a mobile device, and wherein the instructions are further executable to send the corrected audio signal to the mobile device.

19. The system according to claim 15, wherein the voice signal sample is retrieved from a database.

20. The system according to claim 16, wherein extracting text from the detected voice signal includes using a speech-to-text system.

* * * * *